(12) United States Patent
Hirose et al.

(10) Patent No.: US 9,475,435 B2
(45) Date of Patent: Oct. 25, 2016

(54) VEHICLE EXTERIOR COMPONENT

(71) Applicant: TOYODA GOSEI CO., LTD., Kiyosu-shi, Aichi-ken (JP)

(72) Inventors: Yoshikazu Hirose, Kiyosu (JP); Shigeru Yabuya, Kiyosu (JP); Yoshihiro Kurosaki, Kiyosu (JP); Shohei Yamamoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/547,203

(22) Filed: Nov. 19, 2014

(65) Prior Publication Data

US 2015/0145274 A1    May 28, 2015

(30) Foreign Application Priority Data

Nov. 28, 2013  (JP) .................................. 2013-246582

(51) Int. Cl.
    *B60R 13/08*    (2006.01)
    *B60R 13/04*    (2006.01)

(52) U.S. Cl.
    CPC ............... *B60R 13/08* (2013.01); *B60R 13/04* (2013.01)

(58) Field of Classification Search
    CPC ............................... B60R 13/08; B60R 13/04
    USPC ........... 296/39.3, 198, 193.06, 191; 293/120, 293/110; 181/176
See application file for complete search history.

(56) References Cited

U.S. PATENT DOCUMENTS 6,245,408 B1 * 6/2001 Bitzer ..................... F16F 7/121
    428/118
7,556,297 B2 * 7/2009 Ohno ....................... B60R 19/18
    293/120

FOREIGN PATENT DOCUMENTS

| JP | 61-249853 A | 11/1986 |
|---|---|---|
| JP | H02-061699 A | 3/1990 |
| JP | 2005-125962 A | 5/2005 |

OTHER PUBLICATIONS

Office action dated Sep. 6, 2016 issued in the corresponding JP patent application No. 2013-246582 (and English translation).

* cited by examiner

*Primary Examiner* — Joseph D Pape
*Assistant Examiner* — Dana Ivey
(74) *Attorney, Agent, or Firm* — Posz Law Group, PLC

(57) ABSTRACT

A vehicle exterior component includes a honeycomb structure having an inner plate portion arranged in the vicinity of an engine compartment, an outer plate portion arranged at an outer side of the inner plate portion, and a honeycomb portion held between the plate portions. The honeycomb portion includes a plurality of partition walls and a plurality of cells, which are separated from one another by the partition walls. Each of the partition walls of each cell has communication holes, to allow communication between the engine compartment and the interior space of the cell. Each partition wall has an absorbing portion. When external force acting inward is applied to the partition wall, the absorbing portion absorbs energy produced by the external force through deformation of the partition wall at positions corresponding to the peripheries of the communication holes, of the partition wall.

5 Claims, 5 Drawing Sheets

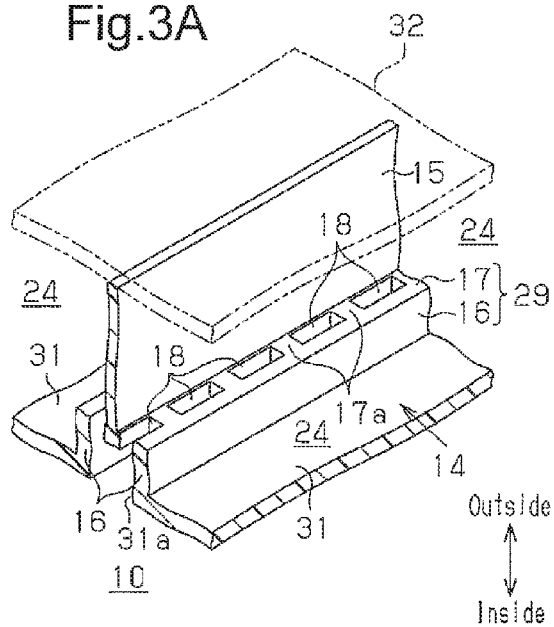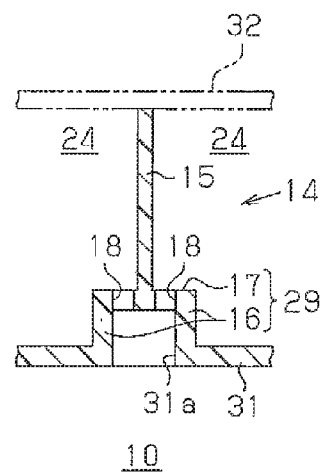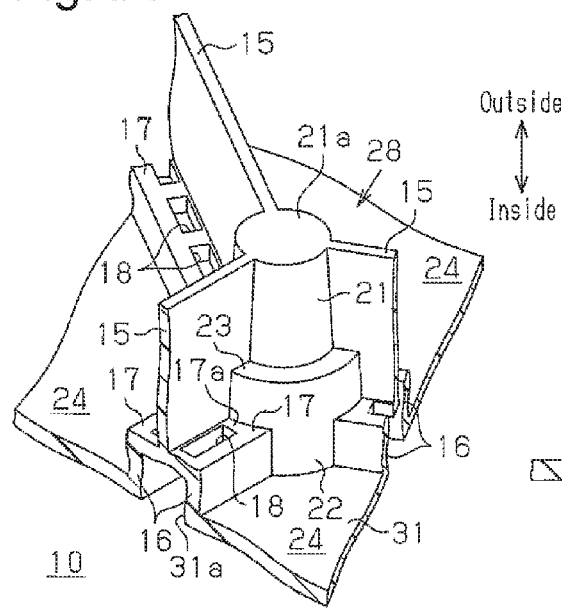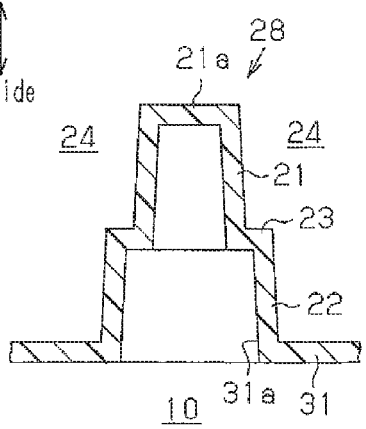

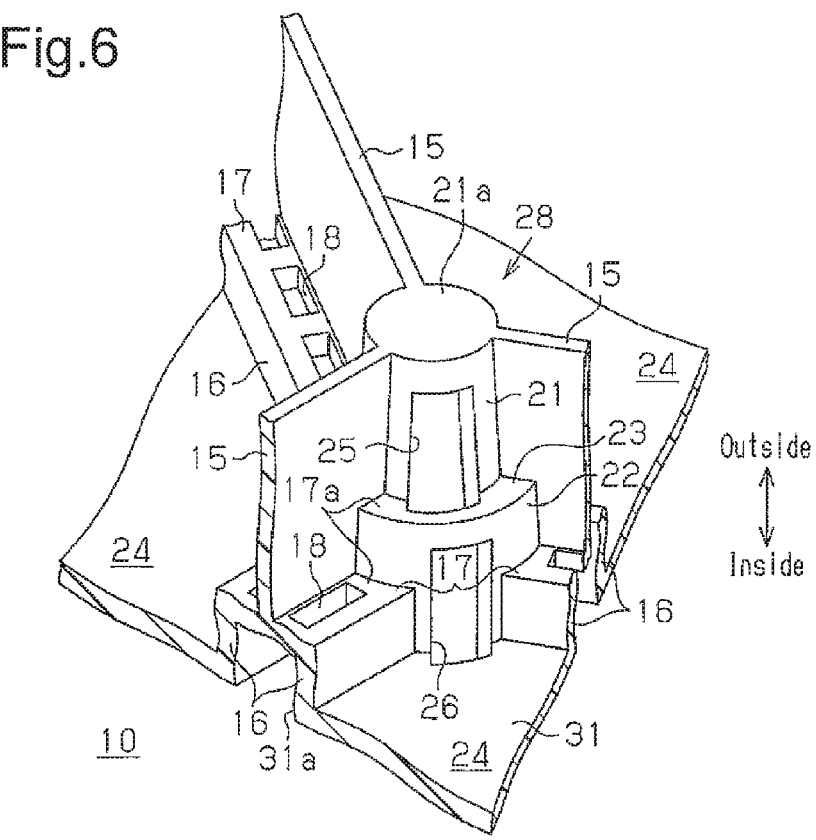
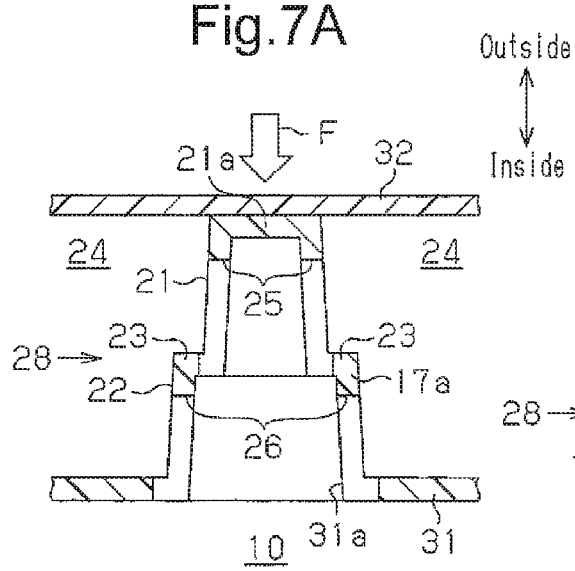
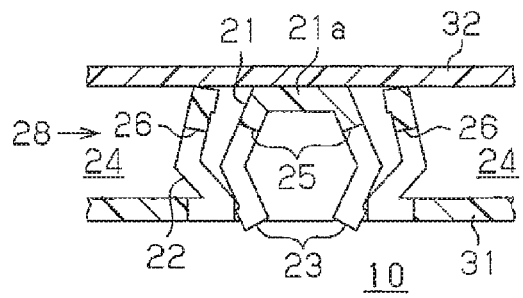

VEHICLE EXTERIOR COMPONENT

BACKGROUND OF THE INVENTION

The present invention relates to a vehicle exterior component arranged in a front portion of the body of a vehicle.

It is known that at least a part of a vehicle exterior component arranged in a front portion of the body of a vehicle, such as a hood or a front fender, may be configured by a plastic honeycomb structure to reduce the weight of the vehicle. The honeycomb structure includes a honeycomb portion, an inner plate portion, and an outer plate portion. The honeycomb portion is configured by a plurality of tubular cells, which are separated from one another by partition walls. The inner plate portion is located on a side of the honeycomb portion that is closer to the engine compartment. The outer plate portion is arranged on a side of the honeycomb portion that is farther from the engine compartment. The outer plate portion and the inner plate portion hold the honeycomb portion from the outer side and the inner side, respectively, to seal the cells.

A sound absorbing configuration that absorbs sound waves generated in an engine compartment by means of a honeycomb structure is known (see, for example, Japanese Laid-Open Patent Publication No. 61-249853). The sound absorbing configuration has communication holes formed in an inner plate portion, which allow communication between the engine compartment and the interior spaces of cells. In this sound absorbing configuration, if sound waves are generated in the engine compartment and have frequency equal to the natural frequency of the air in each communication hole, the sound waves enter the cells through the communication holes and thus resonate. The resonating sound waves are then absorbed through friction with respect to the wall surfaces of the communication holes.

According to Japanese Laid-Open Patent Publication No. 61-249853, partition walls configuring cells have an opening that allows communication between at least two adjacent cells. The purpose of the opening is to enlarge the resonance frequency range.

The configuration of the aforementioned publication reduces sound in the engine compartment, thus decreasing noise emitted from the vehicle. However, the honeycomb structure of the vehicle exterior component is highly rigid, and the vehicle exterior component resists deformation when contacting an obstacle outside the vehicle. This lowers performance of this configuration for attenuation of impact applied to the obstacle.

SUMMARY OF THE INVENTION

Accordingly, it is an objective of the present invention to provide a vehicle exterior component capable of absorbing sound waves generated in an engine compartment and attenuating impact applied to an obstacle when hitting the obstacle.

To achieve the foregoing objective and in accordance with one aspect of the present invention, a vehicle exterior component that includes a honeycomb structure having a portion formed of plastic is provided. The honeycomb structure includes an inner plate portion adapted for arrangement in the vicinity of an engine compartment, an outer plate portion arranged at an outer side of the inner plate portion, and a honeycomb portion held between the inner plate portion and the outer plate portion. The honeycomb portion includes a plurality of partition walls and a plurality of cells separated from one another by the partition walls. Each of the cells has an interior space surrounded by the corresponding ones of the partition walls, the inner plate portion, and the outer plate portion. At least one of the partition walls of each cell has at least one communication hole to allow communication between the engine compartment and the interior space of the cell. The at least one partition wall has an absorbing portion, wherein, when external force acting inward is applied to the partition wall through the outer plate portion, the absorbing portion absorbs energy produced by the external force through deformation of the partition wall at a position corresponding to the periphery of the communication hole of the partition wall.

In this configuration, a part of the sound waves generated in the engine compartment enters each cell through the communication hole(s) formed in the corresponding partition wall. The sound waves are then absorbed, for example, through resonance in the cells.

The communication hole decreases the strength of the absorbing portion, which is formed in the periphery of the communication hole of the partition wall. Accordingly, when the vehicle comes into contact with an obstacle and external force acting inward is applied to the vehicle exterior component through the outer plate portion, the absorbing portion deforms. Such deformation of the absorbing portion absorbs energy caused by the aforementioned contact, thus attenuating impact applied to the obstacle by the vehicle.

BRIEF DESCRIPTION OF THE DRAWINGS

FIG. 3A is an enlarged perspective view showing a portion of a partition wall illustrated in FIG. 2;

FIG. 3B is an enlarged cross-sectional view showing a portion of a partition wall of FIG. 2;

FIG. 4A is an enlarged perspective view showing a portion of a partition wall of FIG. 2;

FIG. 4B is an enlarged cross-sectional view showing a portion of a partition wall of FIG. 2;

FIG. 6 is an enlarged perspective view showing a portion of a partition wall of a vehicle hood, which is a vehicle exterior component according to a second embodiment;

FIG. 7A is a cross-sectional view showing a portion of the partition wall of the second embodiment at a stage where an outer tubular portion and an inner tubular portion, each of which has communication holes, both start to deform to absorb energy; and FIG. 7B is a cross-sectional view showing a portion of the partition wall of the second embodiment at a stage where the outer tubular portion and the inner tubular portion, each of which has communication holes, are both deforming to absorb energy.

DETAILED DESCRIPTION OF THE PREFERRED EMBODIMENTS

First Embodiment

A vehicle hood, which is a vehicle exterior component according to a first embodiment, will now be described with reference to FIGS. 1 to 5.

Figure 1:
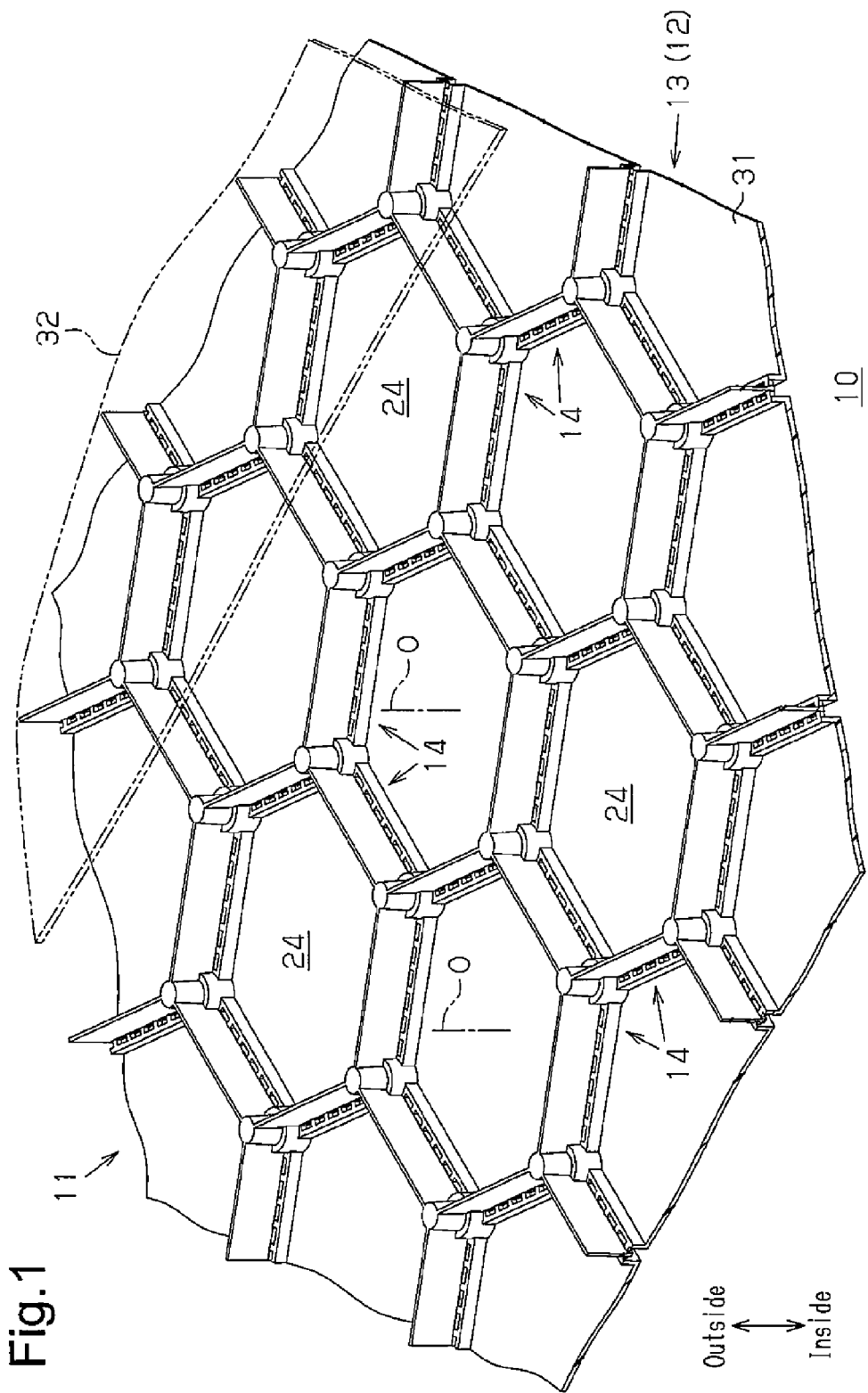
FIG. 1 is a perspective view showing a portion of a hood body of a vehicle hood, which is a vehicle exterior component according to a first embodiment.
Figure 2:
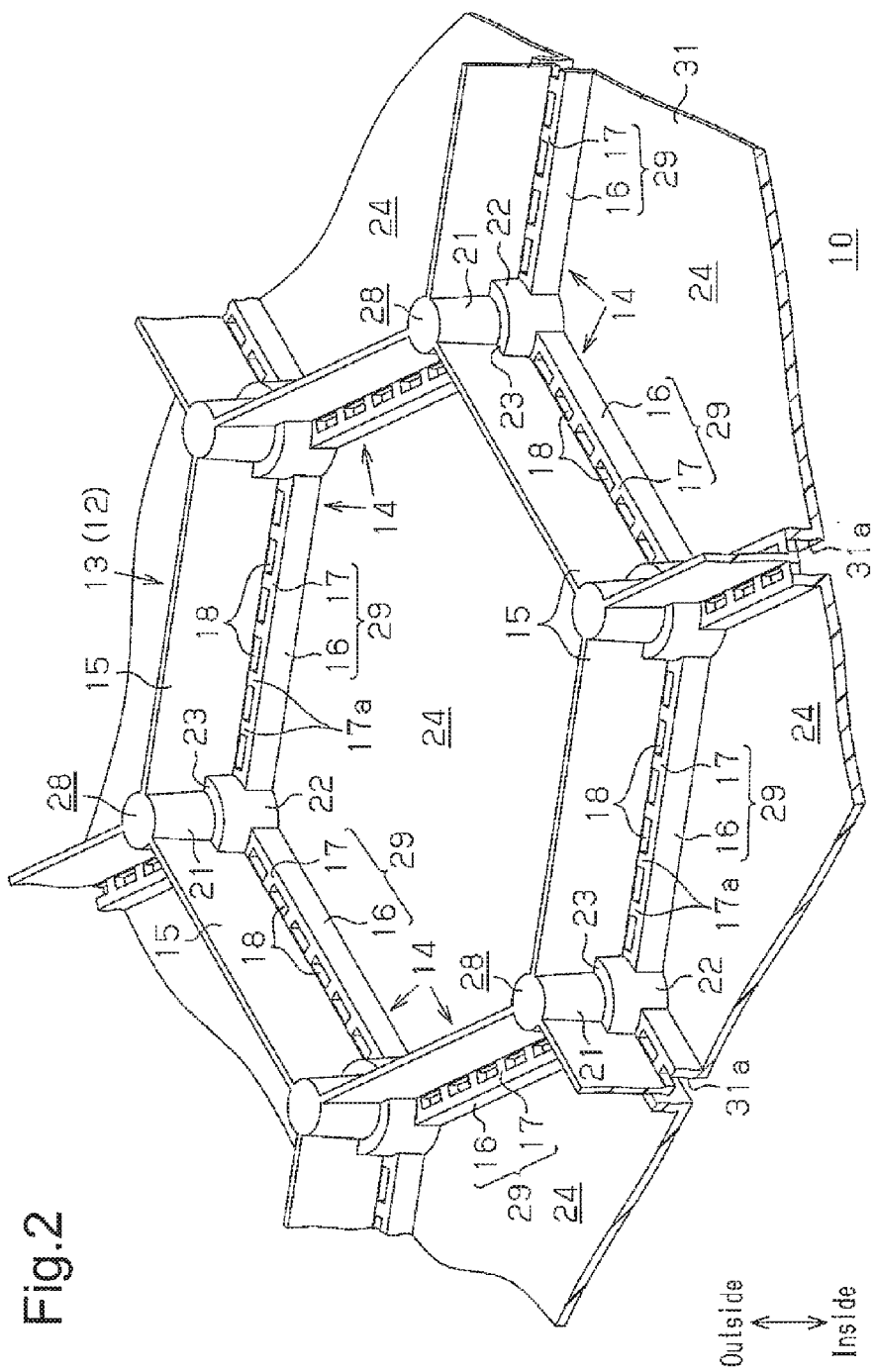
FIG. 2 is an enlarged perspective view showing a portion of the hood body illustrated in FIG. 1.

As shown in FIGS. 1 and 2, a vehicle employing the vehicle hood of the first embodiment has an engine compartment 10 in a front portion of the vehicle. An engine is received in the engine compartment 10. Also, auxiliary devices and a transmission are arranged in the engine compartment 10. The engine, the auxiliary devices, and the transmission produce sound when operating.

A main portion of the vehicle hood is configured by a hood body 11. The hood body 11 is shaped to be capable of closing the upper opening of the engine compartment 10. Besides the hood body 11, the vehicle hood includes a hood hinge and a hood lock striker, which are non-illustrated.

Substantially the entire hood body 11 is formed by a plastic honeycomb structure 12. The honeycomb structure 12 is configured by a honeycomb portion 13, an inner plate portion 31, and an outer plate portion 32. In the honeycomb structure 12, a side closer to the engine compartment 10 is defined as an inner side and a side spaced from the engine compartment 10 is defined as an outer side. The zone surrounded by the honeycomb portion 13, the inner plate portion 31, and the outer plate portion 32 is defined as an interior space.

The honeycomb portion 13 is configured by a plurality of partition walls 14 each having a predetermined height and a plurality of cells 24 each having a polyangular tubular shape (for example, a hexagonal tubular shape), which are separated from one another by the partition walls 14. In the first embodiment, each one of the cells 24 is formed by six of the partition walls 14. The cells 24 are arranged adjacent to one another such that the axes O of the cells 24 extend parallel to one another. The partition walls 14 are arranged parallel to the axes O of the cells 24. If the cells 24 are formed in a hexagonal tubular shape, each cell 24 is adjacent to six cells 24. Each of the partition walls 14 is used in common for the corresponding adjacent pair of the cells 24. By arranging the cells 24 in this manner, the honeycomb portion 13 is formed in a honeycomb shape as a whole.

The inner plate portion 31 is arranged at the inner side of the honeycomb portion 13. The outer plate portion 32 is located at the outer side of the honeycomb portion 13. The inner plate portion 31 and the outer plate portion 32 hold the honeycomb portion 13 from the inner side and the outer side, respectively, to seal the cells 24. The honeycomb portion 13 and the inner plate portion 31 correspond to an inner panel of a typical vehicle hood formed of metal as a whole. The honeycomb portion 13 and the inner plate portion 31 are molded integrally by injection molding using, for example, carbon filler incorporated polypropylene (CFPP).

The outer plate portion 32 corresponds to the outer panel of a typical vehicle hood, which is formed of metal as a whole. The outer plate portion 32 is molded independently from the honeycomb portion 13 and the inner plate portion 31 by injection molding using polypropylene incorporating filler of talc or the like (PPF). The outer plate portion 32 is joined to the outer end surfaces of the partition walls 14 of the honeycomb portion 13 by welding or adhesion. The outer surface of the outer plate portion 32 configures a decorative surface of the vehicle hood.

The honeycomb structure 12 converts the force applied to the outer plate portion 32 and the inner plate portion 31 to bend the outer plate portion 32 and the inner plate portion 31 into the force that extends and compresses the honeycomb portion 13. This ensures improved strength of the honeycomb structure 12. The honeycomb structure 12 characteristically has improved stiffness (surface stiffness), and thus resists deformation.

With reference to FIGS. 2, 3A, and 3B, the partition walls 14 include partition wall bodies 15 shaped like flat elongated rectangular plates, primary boundary portions 29, and secondary boundary portions 28. Each of the secondary boundary portions 28 is arranged between an adjacent pair of the partition wall bodies 15. Each of the primary boundary portions 29 is provided between the inner plate portion 31 and one of the partition wall bodies 15. The outer end surfaces of the partition wall bodies 15 are joint surfaces to which the outer plate portion 32 is joined.

Each of the primary boundary portions 29 is configured by a pair of opposed plate portions 16 and a joint plate portion 17. The opposed plate portions 16 are opposed to each other in a state spaced apart in the direction of the thickness of the corresponding partition wall body 15, extending parallel with each other and outward from the inner plate portion 31.

Each of the opposed plate portions 16 is, like each partition wall body 15, shaped like a flat elongated rectangular plate that extends in the extending direction of the corresponding partition wall body 15. The dimension of each opposed plate portion 16 in the thickness direction of the inner plate portion 31 is small compared to the dimension of the partition wall body 15 in the same direction. Each of the joint plate portions 17 joins the outer end portions of the corresponding pair of the opposed plate portions 16. Each joint plate portion 17 is shaped like a flat elongated rectangular plate extending in the extending direction of the corresponding partition wall body 15. A groove-like space 31a, which is surrounded by each pair of the opposed plate portions 16 and the corresponding joint plate portion 17, communicates with the engine compartment 10. The inner end surface of each partition wall body 15 is joined to a middle portion of the corresponding joint plate portion 17 in the thickness direction of the partition wall body 15.

With reference to FIGS. 2, 4A, and 4B, the secondary boundary portions 28 are each formed substantially in a tubular shape and arranged between the outer plate portion 32 and the inner plate portion 31, extending in the thickness direction of the inner plate portion 31. Specifically, each of the secondary boundary portions 28 is configured by a first tubular portion 21, a second tubular portion 22, a joint plate portion 23, and a lid portion 21a. Each of the first tubular portions 21 is shaped like a hollow truncated cone and extends inward from the outer plate portion 32. The outer end portion of each first tubular portion 21 is closed by the corresponding lid portion 21a, which is shaped like a disk. The inner side of the first tubular portion 21 is open. The outer surface of each lid portion 21a is a joint surface by which the lid portion 21a is joined to the outer plate portion 32. Each of the second tubular portions 22 is shaped like a hollow truncated cone and extends outward from the inner plate portion 31. The inner and outer end portions of each second tubular portion 22 are open. The outer end portion of the second tubular portion 22 has a great diameter compared to the inner end portion of each first tubular portion 21 and encompasses the inner end portion of the corresponding first tubular portion 21. Each of the joint plate portions 23 is shaped like a ring and joins the inner end portion of the corresponding first tubular portion 21 to the outer end portion of the second tubular portion 22. The interior space of each secondary boundary portion 28 communicates with the engine compartment 10 through the spaces 31*a* of the inner plate portion 31.

The diameter of each first tubular portion 21 and the diameter of each second tubular portion 22 increase toward the engine compartment 10. This allows smooth removal of the mold, which is arranged in each secondary boundary portion 28, from the interior of the secondary boundary portion 28 after molding is completed.

Each partition wall body 15 is joined to a portion of the outer peripheral surface of each of the corresponding first tubular portions 21 and a portion of the outer peripheral surface of each of the corresponding second tubular portions 22. Each primary boundary portion 29 is joined to the outer peripheral surfaces of the corresponding second tubular portions 22 and the inner side of the corresponding partition wall body 15.

Each joint plate portion 17 has a plurality of communication holes 18. The communication holes 18 are arranged in the interior space of each cell 24 and aligned along a line that connects the corresponding adjacent pair of the secondary boundary portions 28 to each other. Each of the joint plate portions 17 is located in the interior spaces of two of the cells 24. Each joint plate portion 17 includes two rows of the communication holes 18 corresponding to the corresponding two cells 24. The communication holes 18 of the joint plate portions 17 and the spaces 31*a* of the inner plate portion 31 allow communication between the engine compartment 10 and the interior spaces of the cells 24. In the first embodiment, each of the communication holes 18 has an elongated rectangular opening extending in the extending direction of the corresponding partition wall body 15. The communication holes 18 are aligned and spaced apart in the aforementioned direction. The portion of each joint plate portion 17 corresponding to the peripheries of the communication holes 18 configures an absorbing portion 17*a*. In this manner, the strength of each joint plate portion 17, which has an absorbing portion 17*a*, is set small compared to the strength of a joint plate portion without a communication hole 18. That is, the strength of the joint plate portion 17 is decreased by the communication holes 18. As a result, when external force F acting inward is applied to the hood body 11 through the outer plate portion 32, each joint plate portion 17 absorbs energy produced by the external force F by means of the absorbing portion, which corresponds to the peripheries of the corresponding communication holes 18.

The inner plate portion 31, and the air layer in each cell 24, and the outer plate portion 32 cause the air in each communication hole 18 to function as a weight and the air in the cell 24 to function as a spring. This configures a Helmholtz resonator, which causes resonance of entering sound waves having a frequency equal to the natural frequency of the weight and absorbs the sound waves through friction with respect to the wall surfaces of the communication hole 18.

In the Helmholtz resonator, the resonance frequency f0 is generally represented by the expression (I) shown below.

$$f0 = (C/2\pi) \cdot \sqrt{(S/\Pi + 0.8d)V)} \qquad (I)$$

C: the speed of sound in the air
S: the sum of open areas of the communication holes 18
t: the thickness of the component (the joint plate portion 17) having the communication holes 18
d: the diameter of the communication hole 18
V: the volume of the air layer (in the cell 24)

These values are set such that the resonance frequency f0 of the Helmholtz resonator is equal or approximate to the frequency of the sound waves generated by a sound source in the engine compartment 10, such as the engine.

The Helmholtz resonator absorbs sound through friction between resonating sound waves and the wall surfaces of the communication holes 18. This allows absorption of sound with frequency lower than that of a case employing a porous sound absorbing material, which is, more specifically, frequency lower than 1 kHz. Since Helmholtz resonators are publicly known, further description thereof is omitted herein.

The vehicle hood of the first embodiment is configured in the above-described manner. Operation of the vehicle hood will now be described with reference to FIGS. 5A to 5C.

A part of sound waves generated in the engine compartment 10 by a sound source such as the engine enters the cells 24 through the groove-like spaces 31*a* each surrounded by the corresponding primary boundary portions 29 and the communication holes 18 formed in each joint plate portion 17. The air in each communication hole 18 functions as a weight and the air layer in each cell 24 functions as a spring. After entering the cells 24 through the communication holes 18, the sound waves resonate and are absorbed through friction with respect to the wall surfaces of each communication hole 18.

The weight of the vehicle hood of the first embodiment is reduced by employing the configurations described below.

Substantially the entire hood body 11 is formed by the honeycomb structure 12. The honeycomb structure 12 includes the inner plate portion 31, the outer plate portion 32 arranged outward of the inner plate portion 31, and the honeycomb portion 13 held between the inner plate portion 31 and the outer plate portion 32.

Each cell 24 is formed in a hexagonal tubular shape. This reduces the material necessary for the cells 24 and increases the volume of the interior space of each cell 24. As a result, the weight of the honeycomb structure 12 is further decreased.

The outer plate portion 32, the honeycomb portion 13, and the inner plate portion 31, which are the components configuring the honeycomb structure 12, are all formed of plastic.

For the reasons described above, the vehicle hood of the first embodiment is light-weighted compared to a typical metal vehicle hood in which a metal inner panel is arranged at the inner side of a metal outer panel. Also, the vehicle hood of the first embodiment is light-weighted compared to a vehicle hood formed using a metal honeycomb structure. This decreases the energy necessary for operating the vehicle, thus improving fuel efficiency.

Since substantially the entire hood body 11 is formed by the honeycomb structure 12, the hood body 11 has improved strength. In other words, when load caused by impact is applied to the hood body 11 from outside the vehicle, the inner plate portion 31 and the outer plate portion 32 are relatively intolerant to bending stress, but the cells 24 of the honeycomb portion 13 resist extension and compression. In other words, the honeycomb structure 12 exerts improved strength by converting the force applied to the inner plate portion 31 and the outer plate portion 32 into the force that extends and compresses the honeycomb portion 13. As a result, the honeycomb structure 12 has enhanced stiffness (surface stiffness), so that the honeycomb structure 12 resists deformation.

Figure 5A:
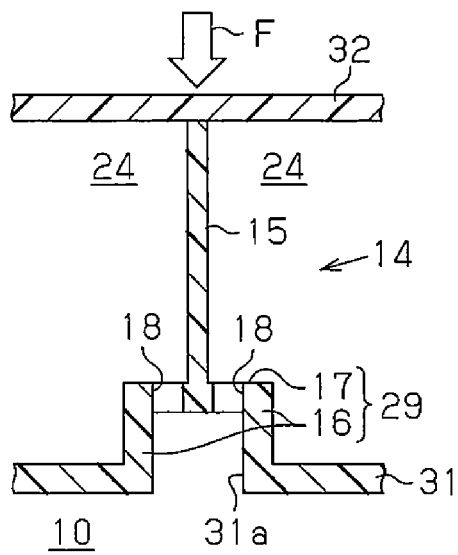
FIG. 5A is a cross-sectional view illustrating a portion of the partition wall at a stage where a joint plate portion having communication holes starts to deform to absorb energy.
Figure 5B:
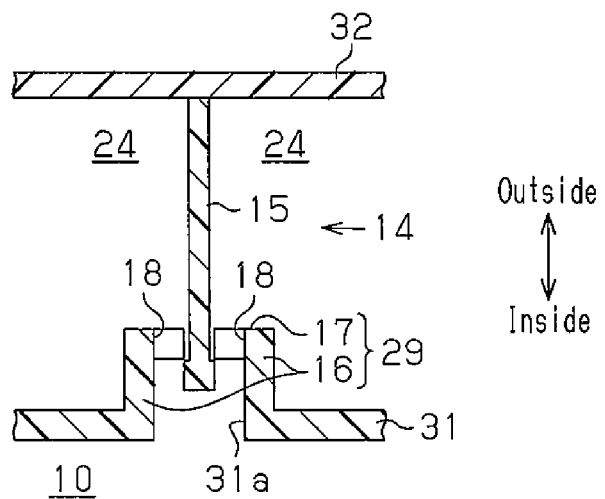
FIG. 5B is a cross-sectional view illustrating the portion of the partition wall at a stage where the joint plate portion having the communication holes is deforming to absorb energy.
Figure 5C:
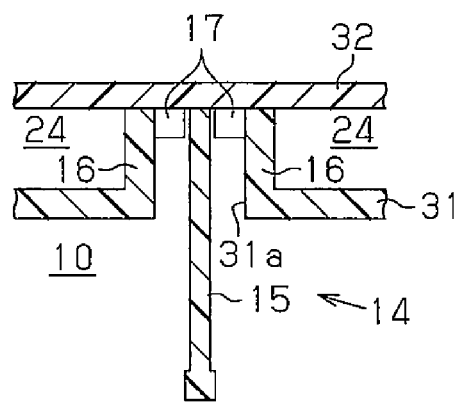
FIG. 5C is a cross-sectional view illustrating the portion of the partition wall at a stage where the joint plate portion having the communication holes has completed deformation to absorb energy.

If the vehicle employing the vehicle hood of the first embodiment comes into contact with an obstacle, external force F acting inward is applied to the vehicle hood through the outer plate portion 32, as illustrated in FIG. 5A. Some of the external force F is transmitted from the outer plate portion 32 to the inner plate portion 31 through the partition wall bodies 15 and the primary boundary portions 29.

The communication holes 18 decrease the strength of the portion of each joint plate portion 17 corresponding to the peripheries of the communication holes 18, which is the absorbing portion. Accordingly, the external force F deforms the joint plate portions 17 in the peripheries of the corresponding communication holes 18. Specifically, with reference to FIGS. 5B and 5C, the peripheries of the communication holes 18 of each joint plate portion 17 are ruptured, thus allowing the partition wall body 15 to pass through the space between the opposed plate portions 16 and move inward together with the outer plate portion 32. Deformation or rupture of the joint plate portions 17 absorbs some of the energy produced by the contact, thus attenuating the impact applied to the obstacle by the vehicle.

The first embodiment as described above has the following advantages.

(1) In the first embodiment, the hood body 11 of the vehicle hood is configured by the honeycomb structure 12. As illustrated in FIG. 1, the honeycomb structure 12 includes the honeycomb portion 13, the inner plate portion 31, and the outer plate portion 32. The honeycomb portion 13 includes the partition walls 14 and the cells 24, which are separated from one another by the partition walls 14. The inner plate portion 31 and the outer plate portion 32 hold the honeycomb portion 13 from the opposite sides, which are the inner side and the outer side, respectively. Each of the partition walls 14 has the communication holes 18, which allow communication between the engine compartment 10 and the interior spaces of the cells 24. When external force F acting inward is applied to each partition wall 14 through the outer plate portion 32, the portion of each joint plate portion 17 corresponding to the peripheries of the communication holes 18, which is the absorbing portion, deforms to absorb energy, as shown in FIG. 3A.

This allows the vehicle hood to absorb sound waves generated in the engine compartment 10, thus decreasing noise emitted to the outside of the engine compartment 10 through the vehicle hood.

The communication holes 18 decrease the strength of each joint plate portion 17. Accordingly, when the vehicle comes into contact with an obstacle and external force F acting inward is applied to the outer plate portion 32, the absorbing portion of each joint plate portion 17 corresponding to the peripheries of the communication holes 18 is deformed. As a result, the vehicle hood attenuates the impact applied to the obstacle by the vehicle.

(2) As illustrated in FIGS. 3A and 3B, the inner plate portion 31, the air layers in the cells 24, and the outer plate portion 32 configure a Helmholtz resonator, which causes the air in each communication hole 18 to function as a weight and the air in each cell 24 to function as a spring.

Accordingly, if sound waves generated in the engine compartment 10 have a frequency equal to the natural frequency of the weight (the air in each communication hole 18) and enter the cells 24 through the communication holes 18, the sound waves resonate and are thus absorbed through friction with respect to the wall surfaces of each communication hole 18.

(3) With reference to FIGS. 3A and 3B, each primary boundary portion 29 is configured by two opposed plate portions 16, which are opposed to each other in a spaced-apart state and extend outward from the inner plate portion 31, and a joint plate portion 17 joining the outer end portions of the opposed plate portions 16 to each other. The joint plate portion 17 has communication holes 18.

Accordingly, a part of the sound waves generated in the engine compartment 10 enters the cells 24 through the spaces 31a of the inner plate portion 31 and the communication holes 18 of the joint plate portions 17. This causes resonance and absorption of the part of the sound waves in the cells 24. If the vehicle comes into contact with an obstacle and external force F acting inward is applied to the vehicle hood through the outer plate portion 32, each joint plate portion 17, the strength of which is decreased by the communication holes 18, is deformed around the peripheries of the communication holes 18. As a result, some of the energy caused by the aforementioned contact is absorbed.

The communication holes 18 for sound absorption are used to decrease the strength of the corresponding joint plate portions 17. This makes it unnecessary to add a structure for attenuating impact by decreasing the strength of each joint plate portion 17 to deform the joint plate portion 17 in response to the external force F.

The communication holes 18 are formed in the joint plate portions 17, each of which configures a portion of a partition wall 14. As a result, it is unnecessary to form communication holes communicating with the cells in the inner plate portion 31, unlike the conventional configuration described in Japanese Laid-Open Patent Publication No. 61-249853. In this manner, reduction in the strength of the inner plate portion 31 caused by the communication holes 18 is avoided.

(4) As illustrated in FIGS. 3A and 3B, each primary boundary portion 29 is arranged in a boundary zone of the corresponding partition wall 14 with respect to the inner plate portion 31, which is a slight zone with a small surface area. The joint plate portion 17 of the primary boundary portion 29 has the communication holes 18.

This makes it unnecessary to form communication holes 18 in the partition wall bodies 15, which occupy a great part of the partition walls 14. As a result, reduction in the strength of the partition wall bodies 15 caused by the communication holes 18 is restrained. This minimizes the influence of the communication holes 18 on the function of the honeycomb structure 12.

(5) In the Helmholtz resonator, as represented by the above-described expression (I), the resonance frequency f0 is proportional to the square root of the sum of the open areas of the communication holes 18. In the first embodiment, each communication hole 18 is formed in an elongated rectangular shape extending in the extending direction of the corresponding partition wall body 15. Accordingly, the open area of each communication hole 18 is changed in correspondence with the length of the communication hole 18 in the aforementioned direction. Accordingly, by increasing the length of each communication hole 18 in the aforementioned direction, for example, the sum of the open areas of the communication holes 18 is increased to raise the resonance frequency f0. This allows the vehicle hood of the first embodiment to absorb sound waves with a high frequency generated in the engine compartment 10.

(6) With reference to FIG. 3A, the communication holes 18 in each joint plate portion 17 are spaced apart in the extending direction of the corresponding partition wall body 15. Accordingly, by adjusting the length or width of the opening of each communication hole 18 or the distance, which is the pitch, between each adjacent pair of the communication holes 18, the strength of the corresponding joint plate portion 17 is changed. In this manner, deformation or rupture of each joint plate portion 17 is brought about at any desired position.

(7) As illustrated in FIGS. 4A and 4B, each secondary boundary portion 28 includes the first tubular portion 21, which is located at the outer side of the secondary boundary portion 28, and the lid portion 21a, which closes the outer end portion of the first tubular portion 21. The lid portion 21a is joined to the outer plate portion 32.

This configuration increases the surface area by which the honeycomb portion 13 is joined to the outer plate portion 32, compared to a configuration employing secondary boundary portions 28 without lid portions 21a. As a result, the honeycomb portion 13 is joined to the outer plate portion 32 with increased firmness.

(8) Referring to FIGS. 3A and 3B, the honeycomb portion 13 is formed integrally with the inner plate portion 31. The outer plate portion 32 is joined to the honeycomb portion 13, which is independent from the outer plate portion 32.

Accordingly, the inner plate portion 31 and the honeycomb portion 13 may be designed to be adapted for noise characteristics in the engine compartment 10. Also, design change, such as color change, of the vehicle hood of the first embodiment involves modification only to the outer plate portion 32.

If the honeycomb portion 13 were formed integrally with the outer plate portion 32, a dent called a sink mark might be formed in the decorative surface, which is the surface of the outer plate portion 32, due to shrinkage of the honeycomb portion 13 after molding. This degrades the outer appearance of the vehicle hood.

However, in the first embodiment, the honeycomb portion 13 is formed integrally with the inner plate portion 31. Accordingly, even if sink marks are formed in a surface of the inner plate portion 31 in plastic molding, formation of sink marks in the surface of the outer plate portion 32 is unlikely. This maintains desired outer appearance of the vehicle hood.

Second Embodiment

A vehicle hood, which is a vehicle exterior component according to a second embodiment, will hereafter be described with reference to FIGS. 6, 7A, and 7B.

In the second embodiment, as shown in FIG. 6, each first tubular portion 21 has communication holes 25, and each second tubular portion 22 has communication holes 26 in addition to the configuration of the first embodiment, in addition to the communication holes 18 of the first embodiment, the communication holes 25, 26 also allow communication between the engine compartment 10 and the interior spaces of the cells 24 through the groove-like spaces 31a of the inner plate portion 31. The communication holes 25 and the communication holes 26 decrease the strength of the portion of each first tubular portion 21 corresponding to the peripheries of the communication holes 25 and the strength of the portion of each second tubular portion 22 corresponding to the peripheries of the communication holes 26, respectively. Accordingly, in the second embodiment, in addition to the portion of the each joint plate portion 17 corresponding to the peripheries of the communication holes 18, the portion of each first tubular portion 21 corresponding to the peripheries of the communication holes 25 and the portion of each second tubular portion 22 corresponding to the peripheries of the communication holes 26 also correspond to the absorbing portion 17a. Like the absorbing portion 17a of each joint plate portion 17 of the first embodiment, the absorbing portion 17a of the second embodiment absorbs energy when external force F acting inward is applied to the outer plate portion 32.

Like or the same reference numerals are given to those components in the second embodiment that are like or the same as the corresponding components of the first embodiment and detailed explanations are omitted.

Operation of the vehicle hood of the second embodiment, which is configured in the above-described manner, will now be described with reference to FIGS. 7A and 7B.

A part of sound waves generated in the engine compartment 10 enters the cells 24 through the communication holes 26 of the second tubular portions 22 and the communication holes 25 of the first tubular portions 21, in addition to the groove-like spaces 31a of the inner plate portion 31 and the communication holes 18 of the joint plate portions 17. The air in each communication hole 18, 25, 26 functions as a weight and the air layer in each cell 24 functions as a spring. After entering the cells 24 through the communication holes 18, 25, 26, the sound waves resonate and are thus absorbed through friction with respect to a wall surface of each communication hole 18, 25, 26.

Referring to FIG. 7A, if the vehicle comes into contact with an obstacle and external force F acting inward is applied to the vehicle hood through the outer plate portion 32, some of the external force F is transmitted to the inner plate portion 31 through the first tubular portions 21, the joint plate portions 23, and the second tubular portions 22.

Strength of the portion of each first tubular portion 21 corresponding to the peripheries of the communication holes 25 and strength of the portion of each second tubular portion 22 corresponding to the peripheries of the communication holes 26 are decreased by the communication holes 25 and the communication holes 26, respectively. Accordingly, as illustrated in FIG. 7B, the first tubular portions 21 and the second tubular portions 22 are deformed by the external force F. Specifically, the first tubular portions 21 and the second tubular portions 22 are bent in the peripheries of the corresponding communication holes 25 and the peripheries of the corresponding communication holes 26, respectively. Each of the bent first tubular portions 21 causes rupture of the corresponding joint plate portion 23 and moves inward together with the outer plate portion 32. Such deformation causes the vehicle hood of the second embodiment to absorb some of the energy caused by the aforementioned contact. As a result, the impact applied to the obstacle by the vehicle is attenuated.

Thus, the second embodiment has the following advantage in addition to the above described advantages (1) to (8).

(9) As illustrated in FIG. 6, each first tubular portion 21 has communication holes 25, and each second tubular portion 22 has communication holes 26.

Accordingly, a part of sound waves generated in the engine compartment 10 enters the cells 24 through the communication holes 25, 26 in addition to the communication holes 18. The part of the sound waves then resonates and is thus absorbed in the cells 24.

Since each first tubular portion 21 and each second tubular portion 22 include the communication holes 25 and the communication holes 26, respectively, the strength of the first tubular portion 21 and the strength of the second tubular portion 22 are decreased. When the vehicle comes into contact with an obstacle, external force F acting inward is applied to the vehicle hood through the outer plate portion 32. In this case, the first tubular portion 21 and the second tubular portion 22 are deformed to absorb some of the energy caused by the aforementioned contact.

(10) In addition to the communication holes 18 of each joint plate portion 17, the communication holes 25 and the communication holes 26 are formed in each first tubular portion 21 and each second tubular portion 22, respectively. This configuration reduces the weight of the vehicle hood compared to the first embodiment.

The above described embodiments may be modified as follows.

<Regarding Honeycomb Structure 12>

Substantially the entire hood body 11 may be formed by the honeycomb structure 12. Alternatively, only a portion of the hood body 11 may be formed by the honeycomb structure 12.

The material of each component of the honeycomb structure 12 is selected from plastics that are sufficiently heat-resistant against the heat in the engine compartment 10. The material of each component of the honeycomb structure 12 is preferably selected while taking into consideration, as necessary, the ease of setting the property of energy absorption through deformation, the ease of handling, and the costs of the opposed plate portions 16, the joint plate portions 17, 23, the first tubular portion 21, and the second tubular portion 22.

From the above-described point of view, the material may be fiber reinforced plastic. The fiber reinforced plastic may be a composite material that is formed using plastic such as polypropylene (PP), polyamide (PA), or polyethylene terephthalate (PET) as the base material and contains fibers having a comparatively small fiber length, such as carbon fibers or glass fibers, as reinforcement material contained in the base material.

<Regarding Configuration of Secondary Boundary Portion 28>

At least one of the first tubular portion 21 and the second tubular portion 22 may be formed in a tubular shape such as an oval tubular shape or a polygonal tubular shape.

In the first embodiment, the secondary boundary portions 28 may be omitted. In this case, each adjacent pair of the partition wall bodies 15, each adjacent pair of the opposed plate portions 16, and each adjacent pair of the joint plate portions 17 are connected directly to each other in the respective pairs.

The diameter of each first tubular portion 21 and the diameter of each second tubular portion 22 may be set in the opposite order to the order of the first embodiment. In other words, the diameter of the outer end portion of the second tubular portion 22 may be smaller than the diameter of the inner end portion of the first tubular portion 21.

Each secondary boundary portion 28 may be configured by a single tubular portion that joins the outer plate portion 32 and the inner plate portion 31 to each other. A communication hole is formed in the tubular portion. In this manner, the portion of the tubular portion corresponding to the periphery of the communication hole corresponds to the absorbing portion.

In this case, a part of sound waves generated in the engine compartment 10 enters the cells 24 through the communication holes formed in the tubular portions. The part of the sound waves then resonates and is thus absorbed in the cells 24.

The strength of the portion of each tubular portion corresponding to the periphery of the communication hole is decreased by the communication hole. Accordingly, when the vehicle comes into contact with an obstacle, external force F acting inward is applied to the vehicle exterior component through the outer plate portion 32. This deforms the portion of each tubular portion having the decreased strength, as has been described, thus causing the tubular portion to absorb some of the energy produced by the aforementioned contact.

<Regarding Communication Holes 18, 25, 26>

In the first embodiment, the communication holes 18 may be formed in the opposed plate portions 16, instead of the joint plate portions 17. Alternatively, the communication holes 18 may be formed in both the joint plate portions 17 and the opposed plate portions 16. Further, each communication hole 18 may be formed continuously from the corresponding opposed plate portion 16 to the joint plate portion 17.

In the second embodiment, either the communication holes 25 or the communication holes 26 may be omitted. Alternatively, each joint plate portion 23 may have a communication hole. In this configuration, the portion of each joint plate portion 23 corresponding to the periphery of the communication hole corresponds to the absorbing portion. In other words, at least one of the first tubular portion 21, the second tubular portion 22, and the joint plate portion 23 may have a communication hole. Further, a communication hole may be formed continuously over two or three adjacent ones of the first tubular portion 21, the joint plate portion 23, and the second tubular portion 22.

In the second embodiment, the communication holes 18 of each joint plate portion 17 may be omitted. For example, the communication holes may be configured only by the communication holes 25 of each first tubular portion 21 and the communication holes 26 of each second tubular portion 22. The absorbing portion may be configured only by the portion of each first tubular portion 21 corresponding to the peripheries of the communication holes 25 and the portion of each second tubular portion 22 corresponding to the peripheries of the communication holes 26. Also in this modification, the vehicle hood absorbs sound waves generated in the engine compartment 10. Further, the vehicle hood attenuates impact applied to an obstacle at the time of crash with the obstacle.

In the first and second embodiments, the shapes or the sizes or the numbers of the communication holes 18, 25, 26 may be changed.

<Regarding Shape and Size of Cells 24>

The cells 24 of the honeycomb structure 12 may be sized uniformly or differently from one position to another in the honeycomb structure 12.

One of the indicators representing the size of each cell 24 is the distance between the two facing partition walls 14 in the cell 24. The size of each cell 24 is modified by changing the distance.

Another one of the aforementioned indicators is the distance between each adjacent pair of the secondary boundary portions 28. The size of each cell 24 becomes greater as the distance increases.

Each cell 24 may have a tubular shape other than the hexagonal tubular shape or a tubular shape different from a polygonal tubular shape, which is, for example, a cylindrical shape.

When each cell 24 is formed in a polygonal tubular shape, the distances between the adjacent pairs of the secondary boundary portions 28 do not necessarily have to be uniform. For example, the cells 24 may each have a flattened hexagonal tubular shape.

<Other Modifications>

If it is desired that the honeycomb structure 12 absorb high-frequency sound waves, the honeycomb structure 12 may additionally include a porous sound absorbing material.

The vehicle hood may be used in a posture extending in a direction different from a substantially horizontal direction, which is, for example, a substantially vertical direction. In this case, the hood body 11 is selectively opened and closed in a substantially horizontal direction. Alternatively, the vehicle hood may be used in a posture extending in a direction inclined with respect to the horizontal direction.

The vehicle exterior component according to the present invention may be embodied in a form other than the vehicle hood. For example, the vehicle exterior component may be an exterior component that is arranged in a front portion of the body of a vehicle and required to protect an obstacle hit by the vehicle and absorb sound. The vehicle exterior component may be, for example, a front fender. Alternatively, the vehicle exterior component may be embodied as a vehicle exterior component at least a portion of which is formed by a plastic honeycomb structure.

The invention claimed is:

1. A vehicle exterior component comprising a honeycomb structure having a portion formed of plastic, wherein the honeycomb structure includes:
   an inner plate portion adapted for arrangement in a vicinity of an engine compartment;
   an outer plate portion arranged at an outer side of the inner plate portion; and
   a honeycomb portion held between the inner plate portion and the outer plate portion,
   the honeycomb portion includes:
   a plurality of partition walls; and
   a plurality of cells separated from one another by the plurality of partition walls,
   each of the plurality of cells has an interior space surrounded by the corresponding ones of the partition walls, the inner plate portion, and the outer plate portion,
   at least one of the partition walls of each cell has at least one communication hole to allow communication between the engine compartment and the interior space of the cell,
   the at least one partition wall has an absorbing portion, wherein, when external force acting inward is applied to the partition wall through the outer plate portion, the absorbing portion absorbs energy produced by the external force through deformation of the partition wall at a position corresponding to the periphery of the communication hole of the partition wall, and
   the vehicle exterior component is adapted to cause resonance of sound waves entering the communication hole of the at least one partition wall and to absorb the sound waves through friction between the sound waves and a wall surface of the communication hole of the at least one partition wall.

2. The vehicle exterior component according to claim 1, wherein
   each of the plurality of partition walls has a primary boundary portion adjacent to the inner plate portion,
   the primary boundary portion includes
   a pair of opposed plate portions that are opposed to each other in a spaced-apart state and extend outward from the inner plate portion, and
   a joint plate portion that joins outer end portions of the opposed plate portions to each other, and
   the communication hole is formed in at least one of the two opposed plate portions and the joint plate portion.

3. The vehicle exterior component according to claim 2, wherein
   the at least one communication hole of the at least one partition wall has an opening exposed to the interior space of the corresponding cell, and
   the opening has an elongated rectangular shape extending in the direction in which the partition wall extends.

4. The vehicle exterior component according to claim wherein
   the plurality of cells each have a polygonal tubular shape,
   each partition wall includes a secondary boundary portion arranged at an apex of the polygonal tubular shape and between the outer plate portion and the inner plate portion, and
   the at least one communication hole is formed in the secondary boundary portion.

5. The vehicle exterior component according to claim 4, wherein
   each of the secondary boundary portions includes
   a first tubular portion extending inward from the outer plate portion,
   a second tubular portion extending outward from the inner plate portion and having a diameter of an outer end portion that is different from the diameter of an inner end portion of the first tubular portion, and
   a joint plate portion joining the inner end portion of the first tubular portion and the outer end portion of the second tubular portion to each other, and
   the at least one communication hole is formed in at least one of the first tubular portion, the second tubular portion, and the joint plate portion.

* * * * *